(12) United States Patent
Fuller

(10) Patent No.: US 12,164,481 B2
(45) Date of Patent: *Dec. 10, 2024

(54) DATABASE SYNCING

(71) Applicant: Google LLC, Mountain View, CA (US)

(72) Inventor: Alfred Fuller, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,522

(22) Filed: Mar. 13, 2023

(65) Prior Publication Data

US 2023/0214362 A1    Jul. 6, 2023

Related U.S. Application Data

(63) Continuation of application No. 16/993,210, filed on Aug. 13, 2020, now Pat. No. 11,615,058, which is a
(Continued)

(51) Int. Cl.
*G06F 16/27* (2019.01)
*G06F 16/17* (2019.01)
(Continued)

(52) U.S. Cl.
CPC ........ *G06F 16/178* (2019.01); *G06F 16/1734* (2019.01); *G06F 16/1873* (2019.01);
(Continued)

(58) Field of Classification Search
CPC .............................. G06F 16/27; G06F 16/2358
See application file for complete search history.

(56) References Cited

U.S. PATENT DOCUMENTS 5,924,096 A    7/1999 Draper et al.
5,999,947 A    12/1999 Zollinger et al.
(Continued)

FOREIGN PATENT DOCUMENTS

EP    2741217 A1    6/2014
WO    9854662 A1    12/1998

OTHER PUBLICATIONS

International Search Report and Written Opinion for the related Application No. PCT/US2018/037534 dated Sep. 7, 2018.
(Continued)

*Primary Examiner* — William Spieler
(74) *Attorney, Agent, or Firm* — Honigman LLP; Brett A. Krueger

(57) ABSTRACT

A method for database syncing is provided. The method includes receiving database change indicators indicating changes to a database. For each database change indicator, the method also includes determining whether the respective change to the database corresponds to a single change to a single version of the database, one of multiple changes to a common version of the database, or one of multiple changes to different versions of the database. The method further includes generating a change log compaction data structure comprising entries. Each entry includes an exact entry defining a corresponding single change to a corresponding single version of the database, a range entry defining corresponding multiple changes to a corresponding common version of the database, or an interval entry defining corresponding multiple changes to corresponding different versions of the database.

16 Claims, 13 Drawing Sheets

Related U.S. Application Data continuation of application No. 15/842,008, filed on Dec. 14, 2017, now Pat. No. 10,769,114.

(51) Int. Cl.
*G06F 16/178* (2019.01)
*G06F 16/18* (2019.01)
*G06F 16/21* (2019.01)
*G06F 16/22* (2019.01)
*G06F 16/23* (2019.01)
*G06F 16/40* (2019.01)

(52) U.S. Cl.
CPC ........ *G06F 16/219* (2019.01); *G06F 16/2228* (2019.01); *G06F 16/2358* (2019.01); *G06F 16/27* (2019.01); *G06F 16/40* (2019.01)

(56) References Cited

U.S. PATENT DOCUMENTS

| | | | |
|---|---|---|---|
| 7,415,486 B2 | 8/2008 | Multer | |
| 7,685,253 B1 | 3/2010 | Valia | |
| 8,924,429 B1* | 12/2014 | Fisher | G06F 16/2477 |
| | | | 707/802 |
| 9,110,850 B2 | 8/2015 | Katz et al. | |
| 9,367,560 B1 | 6/2016 | Ely et al. | |
| 2004/0030703 A1 | 2/2004 | Bourbonnais et al. | |
| 2009/0064160 A1 | 3/2009 | Larson et al. | |
| 2010/0023533 A1 | 1/2010 | Celi, Jr. et al. | |
| 2013/0166554 A1 | 6/2013 | Yoon et al. | |
| 2013/0166557 A1* | 6/2013 | Fricke | G06F 16/278 |
| | | | 707/E17.089 |
| 2014/0052690 A1 | 2/2014 | Kamireddy et al. | |
| 2015/0199416 A1* | 7/2015 | Kashyap | G06F 16/178 |
| | | | 707/622 |
| 2015/0293937 A1* | 10/2015 | Zhang | G06F 16/1824 |
| | | | 707/827 |
| 2015/0379100 A1* | 12/2015 | Vermeulen | G06F 16/27 |
| | | | 707/620 |
| 2017/0199921 A1* | 7/2017 | Khanlarov | G06F 16/2358 |
| 2018/0293165 A1* | 10/2018 | Zik | G06F 16/273 |

OTHER PUBLICATIONS

Chinese Office Action for the related Application No. 201880035800.X, dated Mar. 1, 2023, 17 pages.

\* cited by examiner

DATABASE SYNCING

CROSS REFERENCE TO RELATED APPLICATIONS

This U.S. patent application is a continuation of, and claims priority under 35 U.S.C. § 120 from, U.S. patent application Ser. No. 16/993,210, filed on Aug. 13, 2020, which is a continuation of U.S. patent application Ser. No. 15/842,008, filed on Dec. 14, 2017. The disclosures of these prior applications are considered part of the disclosure of this application and are hereby incorporated by reference in their entireties.

TECHNICAL FIELD

This disclosure relates to syncing databases.

BACKGROUND

Databases are a ubiquitous part of data storage. Databases are generally responsible for many services used every day within information systems. Databases have an organized structure that stores data and allows the stored data to be accessed or queried. The organized structure may form relationships between data within a database for database users to reference related data. As some databases change or update over time, database users often seek to synchronize to these modified databases and to understand such modifications.

SUMMARY

One aspect of the disclosure provides a method for database syncing. The method includes receiving, at data processing hardware, database change indicators indicating changes to a database. For each database change indicator, the method also includes determining, by the data processing hardware, whether the respective change to the database corresponds to: a single change to a single version of the database; one of multiple changes to a common version of the database; or one of multiple changes to different versions of the database. The method further includes generating, by the data processing hardware, a change log compaction data structure including entries. Each entry includes an exact entry defining a corresponding single change to a corresponding single version of the database, a range entry defining corresponding multiple changes to a corresponding common version of the database, or an interval entry defining corresponding multiple changes to corresponding different versions of the database.

Implementations of the disclosure may include one or more of the following optional features. In some implementations, the change log compaction data structure includes an index space and a data space, any negative space of the index space includes known space having no changes to the database. Optionally, the database change indicator may include a commit log entry. Additionally or alternatively, the different versions of the database corresponding to the interval entry may span a continuous interval of time.

Another aspect of the disclosure provides a method for database syncing. The method includes receiving, at data processing hardware, a query for changes to a database from a client, the query indicating a set of data ranges and an interval of time. The method also includes accessing, by the data processing hardware, a change log compaction data structure including entries. Each entry includes: an exact entry defining a corresponding single change to a corresponding single version of the database; a range entry defining corresponding multiple changes to a corresponding common version of the database; or an interval entry defining corresponding multiple changes to corresponding different versions of the database. The method further includes determining, by the data processing hardware, whether any entry of the change log compaction data structure satisfies the query. When at least one entry of the change log compaction data structure satisfies the query, the method includes returning, by the data processing hardware, the corresponding at least one entry to the client.

This aspect may include one or more of the following optional features. In some examples, when at least one entry of the change log compaction data structure satisfies the query, the method includes returning, by the data processing hardware, at least one of the following: a database change indicator, a database change log entry, or a change, that corresponds to the at least one entry of the client. In some implementations, when at least one entry of the change log compaction data structure satisfies the query, the method includes returning, by the data processing hardware, a bloom filter corresponding to the at least one entry of the client.

In some configurations, the change log compaction data structure includes an index space and a data space. Here, any negative space of the index space includes known space having no changes to the database. When at least one entry of the change log compaction data structure satisfies the query, the method may include returning, by the data processing hardware, any overlapping entries of the index space of the at least one entry satisfying the query, at or following the at least one entry satisfying the query. Additionally or alternatively, when multiple entries of the change log compaction data structure satisfy the query, the method may include returning, by the data processing hardware, the corresponding entries to the client as a range sorted by a start of the range in the index space or the data space.

In some implementations, the method includes determining, by the data processing hardware, whether any entry of the change log compaction data structure satisfying the query includes an interval entry. For each interval entry satisfying the query, the method may include returning a span defined as a set of all corresponding versions of the database defined by the interval entry, the span having a start version of the database and an end version of the database.

Another aspect of the disclosure provides a system for database syncing. The system includes data processing hardware and memory hardware in communication with the data processing hardware. The memory hardware stores instructions that when executed on the data processing hardware cause the data processing hardware to perform operations. The operations include receiving database change indicators indicating changes to a database. For each database change indicator, the operations include determining, whether the respective change to the database corresponds to a single change to a single version of the database, one of multiple changes to a common version of the database, or one of multiple changes to different versions of the database. The operations also include generating a change log compaction data structure including entries. Each entry includes an exact entry defining a corresponding single change to a corresponding single version of the database, a range entry defining corresponding multiple changes to a corresponding common version of the database, or an interval entry defining corresponding multiple changes to corresponding different versions of the database.

Implementation of the disclosure may include one or more of the following optional features. In some configurations, the change log compaction data structure includes an index space and a data space. Here, any negative space of the index space includes known space having no changes to the database. In some examples, the database change indicator includes a commit log entry. Additionally or alternatively, the different versions of the database corresponding to the interval entry may span a continuous interval of time.

Yet another aspect of the disclosure provides a system for syncing databases. The system includes data processing hardware and memory hardware in communication with the data processing hardware. The memory hardware stores instructions that when executed on the data processing hardware cause the data processing hardware to perform operations. The operations include receiving a query for changes to a database from a client. The query indicates a set of data ranges and an interval of time. The operations also include accessing a change log compaction data structure which includes entries. Each entry includes an exact entry defining a corresponding single change to a corresponding single version of the database, a range entry defining corresponding multiple changes to a corresponding common version of the database, or an interval entry defining corresponding multiple changes to corresponding different versions of the database. The operations also include determining whether any entry of the change log compaction data structure satisfies the query. When at least one entry of the change log compaction data structure satisfies the query, the operations include returning the corresponding at least one entry to the client.

Implementations of this aspect may include one or more of the following optional features. In some implementations, when at least one entry of the change log compaction data structure satisfies the query, the operations include returning at least one of a database change indicator, a database change log entry, or a change corresponding to the at least one entry of the client. In some implementations, when at least one entry of the change log compaction data structure satisfies the query, the system includes returning a bloom filter corresponding to the at least one entry of the client.

In some examples, the change log compaction data structure includes an index space and a data space. In this example, any negative space of the index space includes known space having no changes to the database. When at least one entry of the change log compaction data structure satisfies the query, the operation may include returning any overlapping entries of the index space of the at least one entry satisfying the query, at or following the at least one entry satisfying the query. Additionally or alternatively, when multiple entries of the change log compaction data structure satisfy the query, the operations may include returning the corresponding entries to the client as a range sorted by a start of the range in the index space or the data space.

In some configurations, the operations include determining whether any entry of the change log compaction data structure satisfying the query includes an interval entry. Here, for each interval entry satisfying the query, the operations include returning a span defined as a set of all corresponding versions of the database defined by the interval entry, the span having a start version of the database and an end version of the database.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
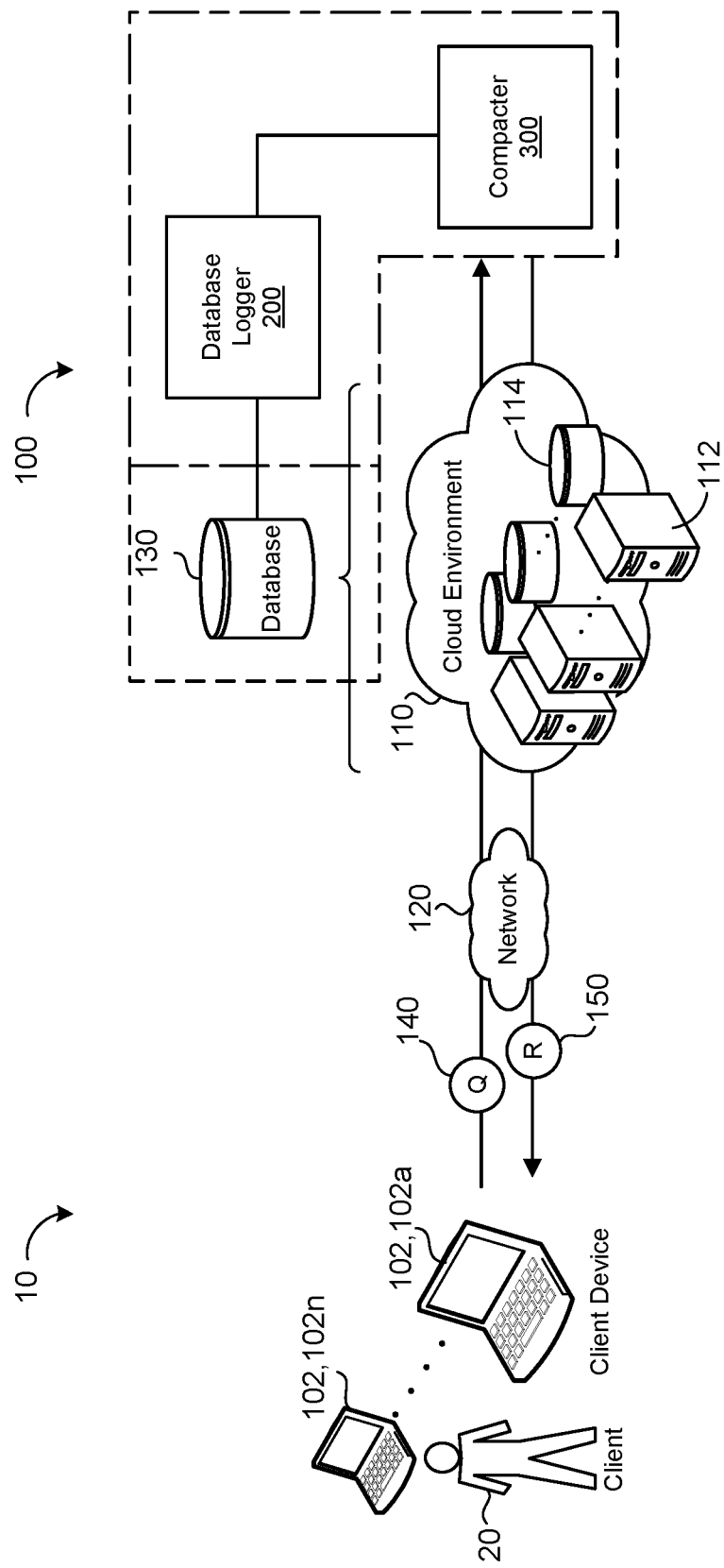
FIGS. 1A and 1B are schematic views of example database synchronization environments.

Today computing devices often rely on databases. These databases may include large amounts of data that may change and mutate over time. As the data within a database changes, the device and/or client of the database will need to synchronize with the changes. Rather than acquire a significant portion of the database each time a device attempts to synchronize with a database, devices may be generally configured to solely identify changes that have occurred since the last update. Although this approach reduces the amount of data within a database a device may have to receive, the approach may remain inefficient. For example, the device may have to parse through the entire database looking for changes since the last update. Some approaches for example create markers within the database corresponding to each change that occurs. Yet over time and large amounts of data, even markers become increasingly inefficient. Therefore, it is desirable to provide a compact space conserving data structure to more effectively and more efficiently synchronize with a database.

Referring to FIG. 1, in some implementations, an example database synchronization environment 10 includes one or more client devices 102, 102a-n, each associated with a respective client 20 in communication with a database synchronization system 100 of a remote system 110 via a network 120. The remote system 110 may be a distributed system (e.g., a cloud environment) having scalable/elastic computing resources 112 (e.g., data processing hardware) and/or storage resources 114 (e.g., memory hardware). The database synchronization system 100 is configured to synchronize information and/or data regarding a database 130, such as a distributed database 130 of the remote system 110 (e.g., FIG. 1). Although, the disclosure illustrates the database synchronization system 100 with respect to a distributed system (e.g., the cloud environment), the database synchronization system 100 may interact with any type of database. Some examples of other types of databases 130 include relational databases (e.g., structured query language database), non-structured query language databases (e.g., a document database, a graph database, a key-value database, or a table-style database), or object-oriented databases. Additionally or alternatively, the database 130 may be more than one database of the same database type or more than one database of different types of databases.

As illustrated by a dotted line enclosure in FIG. 1A, the database synchronization system 100 generally includes a database logger 200 and a compacter 300. To synchronize information and/or data regarding the database 130, the database synchronization system 100 tracks changes to the database 130 and constructs a data structure based on these tracked changes. The database logger 200 is configured to track changes to the database 130 and to communicate the tracked changes to the compacter 300. With the communicated changes from the database logger 200, the compacter 300 constructs the data structure based on the changes. In some examples, the database 130 is additionally integrated into the synchronization system 100. For example, FIG. 1A illustrates the database 130 as optional to the database synchronization system 100 by a dotted box around the database 130. Integrating the database 130 with the database synchronization system 100 may, depending on the configuration of the database synchronization environment 10, reduce communication time between the database synchronization system 100 and the database 130. In some implementations, the database synchronization system 100 is a database management system or part of a database management system. This management system may be local to the database 130 or remotely communicate with the database 130.

Figure 1B:
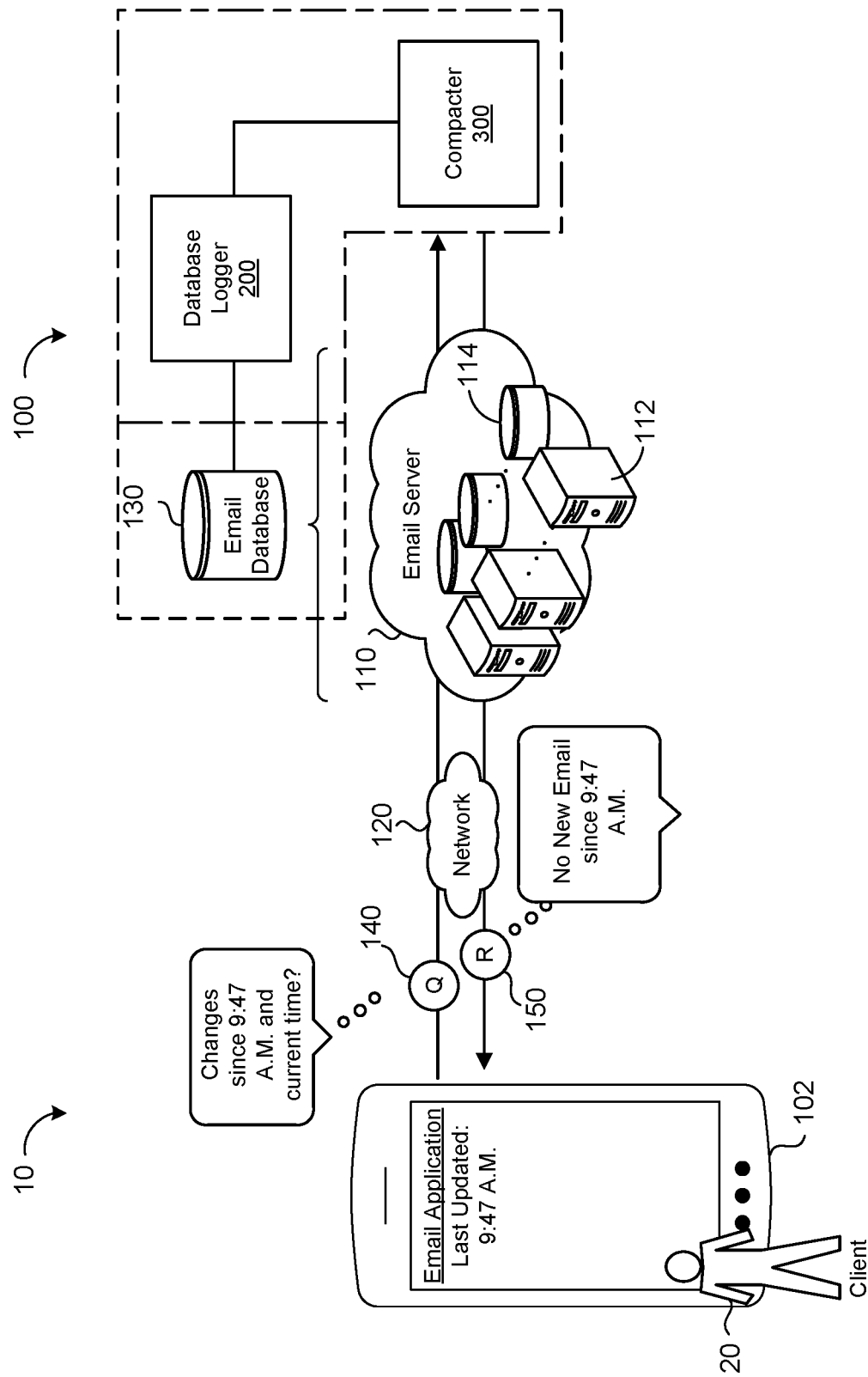

Referring to FIG. 1B, a client 20, via a client device 102, sends a query 140 to the database synchronization system 100. The query 140 refers to a request by the client 20 to extract data from the database 130. Here, by the query 140, the client 20 seeks to synchronize the client device 102 with data contained within the database 130. Synchronization generally refers to a process of updating or catching up the client 20 to changes that have occurred within the database 130 since the client 20, via the client device 102, last communicated with the database 130. As an example, a client 20 using an electronic mail (email) application synchronizes with an email database 130 corresponding to a cloud based email server 110. In this example, the client 20 synchronizes with the email database 130 by opening the email application on a client device 102, such as a mobile phone, or by selecting to send and to receive email within the email application. In other words, the client 20 synchronizes with the email database 130 by a query 140 to send and to receive email. For example, FIG. 1B depicts the query 140 as asking the database synchronization system 100 if there have been any "changes since 9:47 A.M. and the current time." In this example, the client 20 last updated (i.e. synchronized) his or her email at 9:47 A.M. and wants to know if there have been any updates to his or her email between the current time of the query 140 and the last update at 9:47 A.M. As part of the synchronization, the database synchronization system 100 identifies whether any updates (e.g., new emails) have occurred by determining whether there have been any changes (e.g., additions of data such as email) to the email database 130. Based on this determination, the database synchronization system 100 communicates a response 150 that there has been "no new email since 9:47 A.M."

Figure 2:
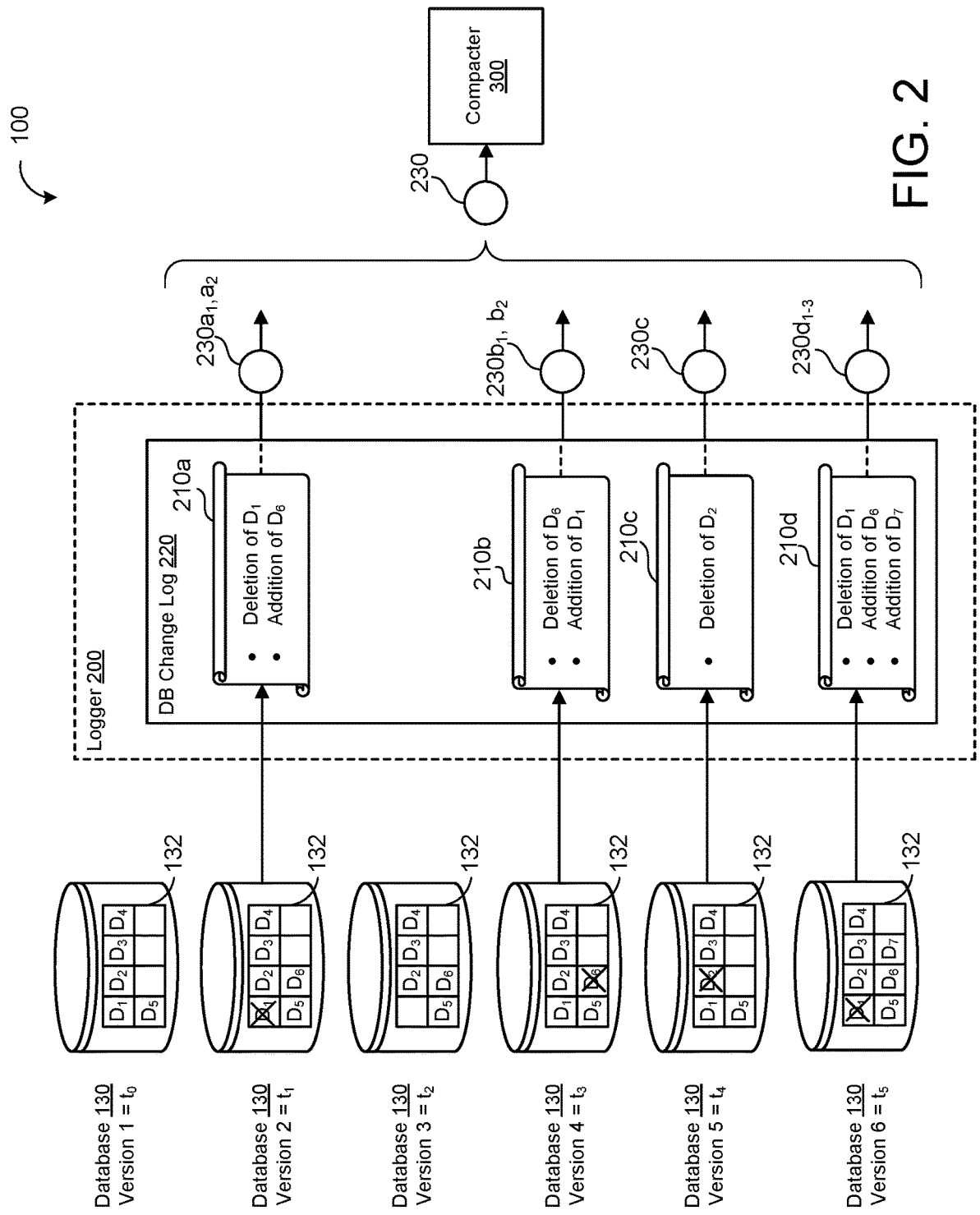
FIG. 2 is a schematic view of an example database logger within a database synchronization environment.

FIG. 2 provides further detail to the database logger 200 of the database synchronization system 100. FIG. 2 includes an example of the database 130 over a progression of time. As illustrated by FIG. 2, databases, such as database 130, include a dataspace 132. A dataspace generally refers to a space accessible for or occupied with data D. For example, FIG. 2 depicts database 130 with a simplified dataspace having eight spaces for data D. Over a progression of time, different versions "t" of the database 130 may capture changes (e.g., write functions or delete functions) made to the dataspace 132. A version of the database 130 is the database 130 at a particular moment of time such that each version t represents a different moment in time for the database 130. In other words, versions to of the database 130 correspond to snapshots of the database 130 at discrete intervals of time. Each version t may have an associated time stamp to help identify the version t. In some examples, the version t of the database 130 changes according to a clock of a processor associated with the database 130 such that each incremental version $t_{(n+1)}$ is an increment of the time-clock. In other examples, the version t of the database 130 increments when there is a change to the database 130. In yet other examples, each version t increments according to a preprogrammed interval of time.

FIG. 2 depicts six versions $t_0$-$t_5$ of the database 130. Each version t includes a representation of the dataspace 132 of the database 130. Between each version t of the database 130, changes may occur within the dataspace 132. Each change, such as an addition or a deletion, occurs when a transaction is committed. When a transaction is committed (i.e. a change occurs), the transaction is configured to be memorialized as a change log entry 210 in a database change log 220 (i.e. a commit log or a transaction log). The change log entry 210 may be a line of text related to the transaction, an entry of the actual transaction, or any other representation that signifies or provides a reflection of the change to the database 130 corresponding to the transaction. Additionally or alternatively, each change log entry 210 includes the version t of the database 130 associated with the change.

In some implementations, the database logger 200 includes the database change log 220 with the corresponding change log entries 210. In some examples, the database logger 200 includes more than one database change log 220 corresponding to more than one database 130. In other examples, the database change logger 200 includes a single database change log 220 for more than one database 130. For simplicity FIG. 2 depicts a single database change log 220 for the database 130.

Referring further to FIG. 2, at a first version to, data $D_1$-$D_5$ occupies the database 130. As the first version to of the database 130 depicted in the example of FIG. 2, no change has yet occurred to the database 130. At a second version $t_1$, data $D_1$ has been deleted from the database 130 and data $D_6$ has been written to the database 130. A first change log entry 210a memorializes the deletion of data $D_1$ and the addition of data $D_6$ in the database change log 220. At a third version $t_2$ of the database 130, data $D_2$—$D_6$ within the dataspace 132 does not change. Without changes, the database logger 200 does not generate a database change log entry 210. At a fourth version $t_3$, data $D_1$ has been written to the database 130 and data $D_6$ has been deleted from the database 130. A second change log entry 210b memorializes the addition of data $D_1$ and the deletion of data $D_6$ in the database change log 220. At a fifth version $t_4$ of the database 130, data $D_2$ has been deleted and a third change log entry 210c memorializes the deletion of data $D_2$. At a sixth version $t_5$, data $D_1$ has been deleted and data $D_6$ and $D_7$ has been written. The database change log 220 includes a fourth entry 210d to represent the changes during the sixth version $t_5$. With each change of a change log entry 210, the database logger 200 may generate a database change indicator 230 corresponding to the change to communicate to the compacter 300. For example, the first change log entry 210a and the second change log entry 210b each correspond to two database change indicators 230, $230a_{1-2}$ and 230, $230b_{1-2}$ respectively, while the fourth change log entry 210d corresponds to three database change log indicators 230, $230d_{1-3}$.

Figure 3A:
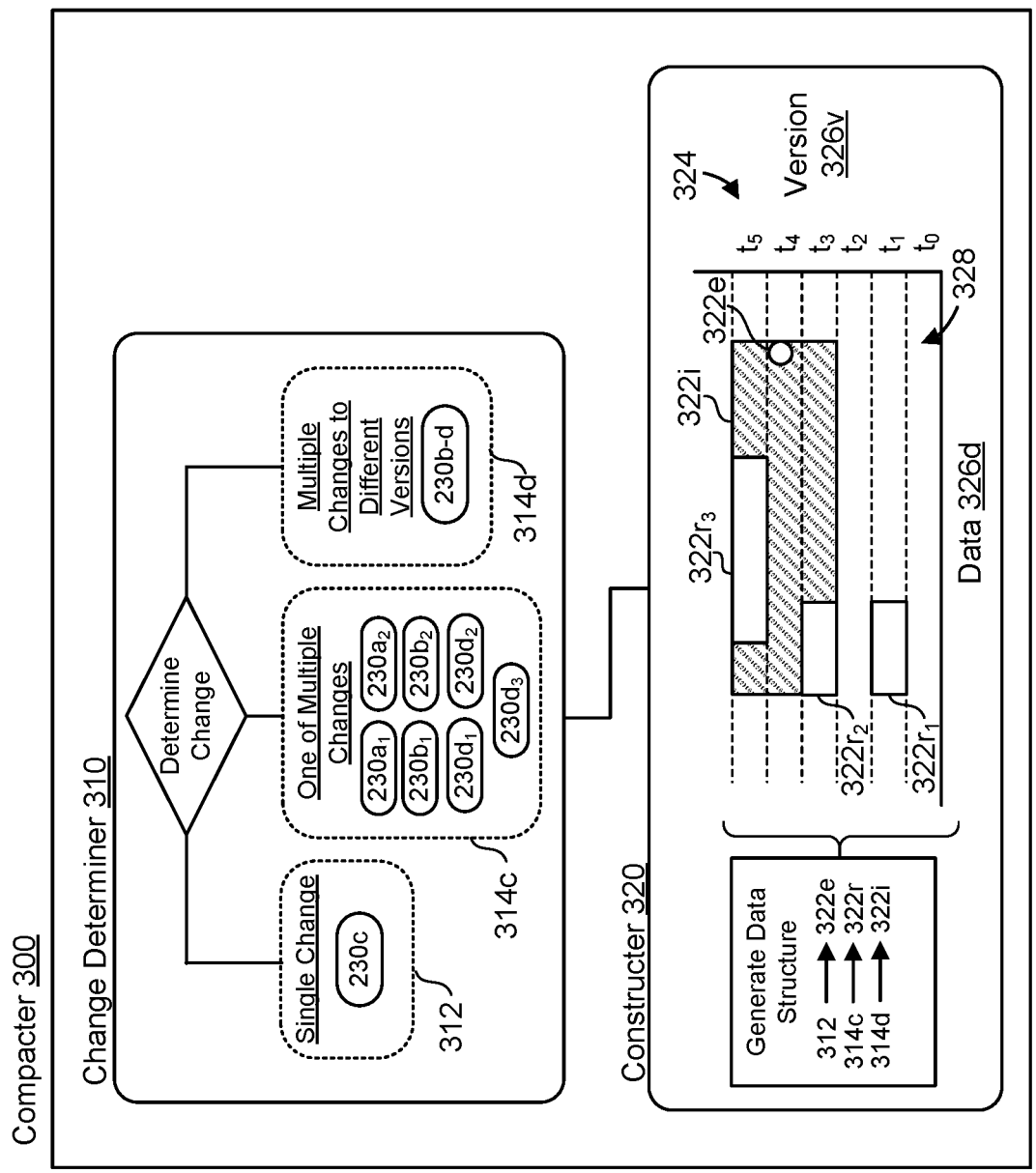
FIGS. 3A-3C are schematic views of example compacters within a database synchronization environment.
Figure 3A:
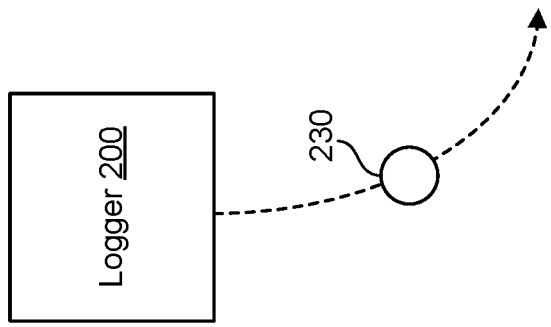
Figure 3B:
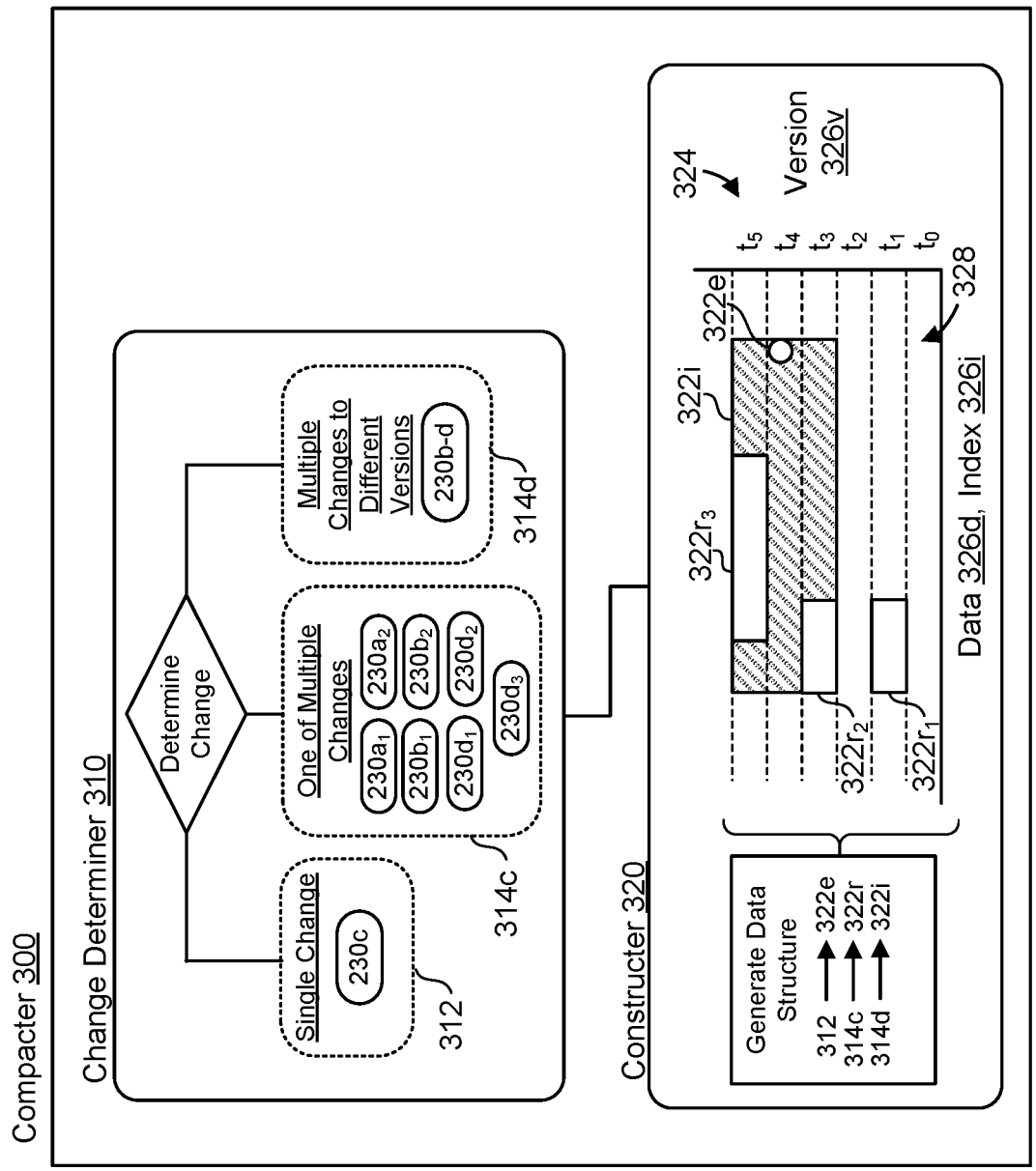
Figure 3B:
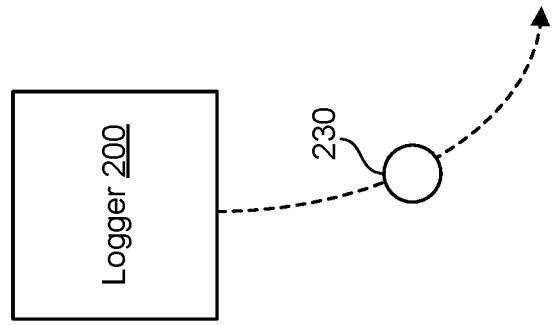
Figure 3C:
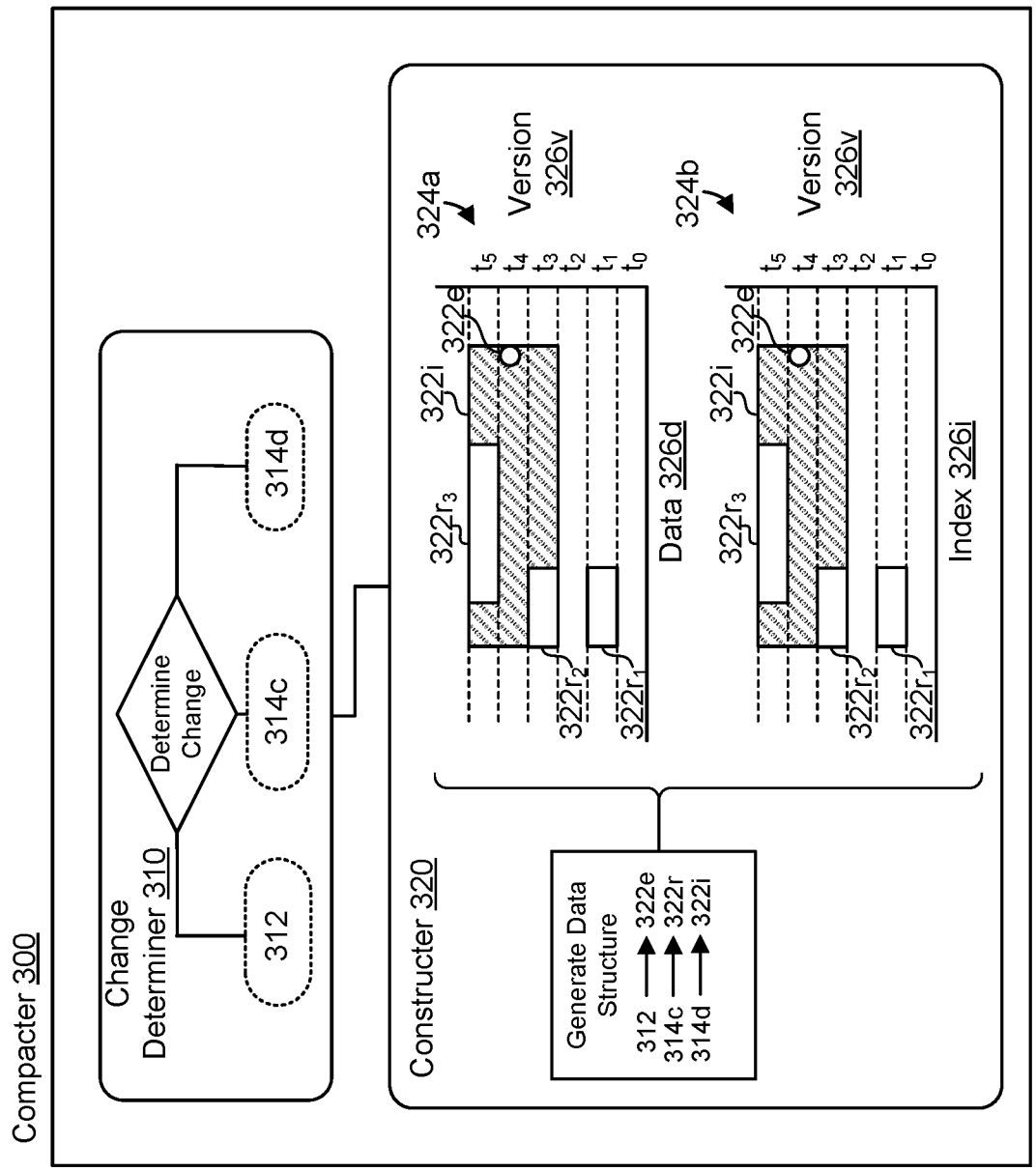
Figure 3C:
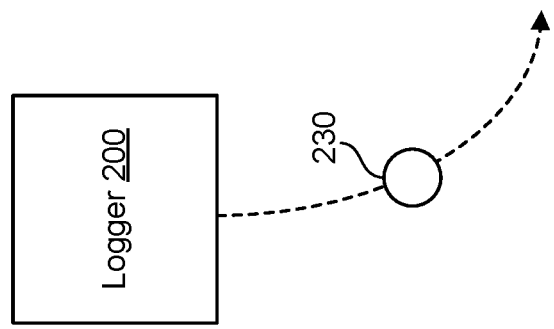

FIGS. 3A-3C are examples of the compacter 300 of the database synchronization system 100. The compacter 300 is configured to receive database change indicators 230 indicating changes to the database 130 from the database logger 200. Depending on the change log entry 210, the database change indicator 230 may be identical to the change log entry 210 (e.g., a commit log entry) or different from the change log entry 210. Configurations with change log entries 210 predominantly similar to the database change indicators 230 may reduce additional processing for the database logger 200 and potentially reduce computational redundancies or risks of error. For each received database change indicator 230, the compacter 300 determines the type of underlying change to the database 130. In some implementations, the compacter 300 includes a change determiner 310 to determine whether the respective change to the database 130 corresponds to a single change 312 to a single version $t_i$ of the database 130, one of multiple changes 314c to a common version $t_1$ of the database 130, or one of multiple changes 314d to different versions of the database 130. For example, as depicted in FIGS. 3A and 3B, the database change indicator 230c corresponds to a single change 312 to the fifth version $t_4$ of the database 230. In FIGS. 3A and 3B, the change determiner 310 also determines that several change indicators 230 correspond to one of multiple changes 314c to a common version $t_1$ of the database 130. Database change indicators $230a_1$ and $230a_2$ correspond to multiple changes 314c to the second version $t_1$ of the database 130. Database change indicators $230b_1$ and $230b_2$ correspond to multiple changes 314c to the fourth version $t_3$ of the database 130. Database change indicators $230d_{1-3}$ correspond to multiple changes 314c to the sixth version $t_5$ of the database 130. Here, a common version refers to changes that occur (i.e. share) during the same version. In other words, these changes have the same version in common. Moreover, collectively, database change indicators 230b-d correspond to multiple changes 314d to different versions, such as the fourth version $t_3$, the fifth version $t_4$, and the sixth version $t_5$.

Referring to FIGS. 3A-3C, the compacter 300 further includes a constructer 320 configured to generate entries 322 that form a change log compaction data structure 324. In some examples, the constructer 320 may generate an exact entry 322e, a range entry 322r, or an interval entry 322i. Each entry 322 corresponds to the different types of changes 312, 314 determined by the change determiner 310 based on the database change indicators 230. The exact entry 322e defines a corresponding single change 312 to a corresponding single version $t_i$ of the database 130. The range entry 322r defines corresponding multiple changes 314c to a corresponding common version $t_1$ of the database 130. The interval entry 322i defines corresponding multiple changes 314d to corresponding different versions of the database 130.

In some implementations, the change log compaction data structure 324 includes a version space 326v and a data space 326d. The version space 326v enables the constructer 320 to build the change log compaction data structure 324 such that a query 140 of the change log compaction data structure 324 by the client 20 may efficiently focus on a particular span of versions $t_i$ (e.g., versions since previous synchronization). The data space 326d, much like the data space 132 of the database 130, corresponds to space accessible for or occupied with entries 322 (i.e. compaction data) within the change log compaction data structure 324. In the examples depicted throughout FIGS. 3A-3C, the change log compaction data structure 324 generally includes the version space 326v and the data space 326d, but may also include an index space 326i (e.g., FIGS. 3B and 3C). Generally speaking, an index is part of a data structure and may optimize searching (e.g., rapid lookup) and accessing of data within the data structure. An index space includes indexes that are unique identifiers, such as a number or a time stamp. The index space 326i may also include a pointer to the underlying data D within the data space 326d that corresponds to the index (i.e. the data that is uniquely identified by the index). Additionally or alternatively, the change log compaction data structure 324 is configured for secondary indexes, which may or may not modify the data changes. Because the change log compaction data structure 324 corresponds to changes over the data space 326d, version space 326v, and/or index space 326i, synchronization with a client 20 roughly scales with the number of changes to a corpus, rather than a size of the corpus (e.g., size of a database). Furthermore, the synchronization system 100 is flexible such that a change log compaction data structure 324 may be constructed at any time (e.g., rather than tied to a time of origination for a database) and the change log compaction data structure is not necessarily a critical dependency in a write path for the database 130. An advantage of the flexibility of the synchronization system 100 is that because the change log compaction data structure 324 may be constructed at any time, the change log compaction data structure 324 does not require durable storage.

In some examples, such as FIG. 3B, the constructer 320 generates a single change log compaction data structure 324 that includes the data space 326d, the index space 326i, and the version space 326v. In other examples, such as FIG. 3C, the constructer 320 is configured to generate more than one change log compaction data structure 324. For example, the constructer 320 generates a first change log compaction data structure 324a with a dataspace 326d and a version space 326v and a second change log compaction data structure 324b with an index space 326i and a version space 326v.

Referring further to FIGS. 3A-3C, the constructer 320 interprets the changes 312, 314c, 314d from the change determiner 310 and generates the change log compaction data structure 324. In these examples, the single change 312 corresponding to the database change indicator 230c generates an exact entry 322e at the fifth version $t_4$ within the change log compaction data structure 324. The database change indicators $230a_{1-2}$, $230b_{1-2}$, $230d_{1-3}$ corresponding to multiple changes 314c to a common version (e.g., the second version $t_1$, the fourth version $t_3$, and the sixth version $t_5$, respectfully) each generate a range entry 322r: the database change indicators $230a_{1-2}$ of the second version $t_1$ generate range entry $322r_1$; the database change indicators $230b_{1-2}$ of the fourth version $t_3$ generate range entry $322r_2$; and the database change indicators $230d_{1-3}$ of the sixth version $t_5$ generate range entry $322r_3$. The database change indicators 230b-d also correspond to multiple changes 314d to different versions of the database 130 (e.g., the fourth version $t_3$, the fifth version $t_4$, and the sixth version $t_5$, respectfully) and generate an interval entry 322i. Here, like some configurations, the interval entry 322i spans a continuous interval of time relating to different versions, such as versions $t_3$—$t_5$. In some examples, entries 322 include metadata, such as an update time or a delete time, corresponding to the underlying change or database change indicator 230. In some implementations, a bloom filter may filter the metadata of the entries 322 which, for example, may later be optimized for secondary indexes. In some configurations, when entries 322 correspond to a delete change, a bloom filter or an existence filter accumulates these changes. This bloom filter or existence filter may then be sent to a client 20 as a response 150 to a query 140. Additionally or alternatively, a bloom filter may be utilized to review data related to an entry 322 and/or to identify the underlying change corresponding to an entry 322.

In some implementations, the constructor 320 constructs the change log compaction data structure 324 such that any negative space 328 is actually known space having no changes to the database 130. When the negative space 328 is actually known space having no changes to the database 130, synchronization may confidently skip large ranges of data without risking missing data. In other words, navigating through the data log compaction data structure 324 may inherently skip large ranges of data because the data log compaction data structure 324 may include only entries 322 (e.g., range entries 322r, interval entries 322i, or exact entries 322e) corresponding to database change indicators 230.

An advantage of the change log compaction data structure 324 is that it is an acceleration structure for finding modified data (i.e. changes) by examining a subset of data space entries and/or index entries. For example, the change log compaction data structure 324 efficiently finds data that has changed since a specific timestamp (e.g., version t). The change log compaction data structure 324 may be a space efficient data structure because all missing data ranges (i.e. data ranges not included in the structure) have been filtered (e.g., a bloom filter) to ensure a client 20 directs a query 140 to predominantly modified data and/or data representations. As an example, the synchronization system 100 is configured to use bloom filters to optimize fetching changed data to incorporate into the change log compaction data structure 324. Bloom filters may be integrated with or operate in conjunction with the database logger 200 and/or the compactor 300.

Additionally or alternatively, the change log compaction data structure 324 may be limited to a finite number of version (e.g., the most recent versions) of the database 130 to further reduce query response time. In other words, the change log compaction data structure 324 is a space conserving structure formed of data relevant to client synchronization with the database 130. Another advantage of the database synchronization system 100 is that it may provide for adaptive granularity by providing primitives to merge entries and permitting decision making about what should be merged and when. For example, merging entries may be simplified with negative space 328 known to have no changes to the database 130.

FIGS. 4A-4D are examples of queries 140 to the database synchronization system 100. In these examples, the compacter 300 further includes a query analyzer 330. The query analyzer 330 is configured to receive the query 140 for changes to the database 130 from the client 20. In some examples, the query 140 indicates a set of data ranges 142 and an interval of time 144. For example, referring back to FIG. 1B, the query 140 implied an interval of time 144 by querying whether there had been updates since the last update at 9:47 A.M. In other words, the query 140 itself implied an interval of time 144 between the 9:47 A.M. and the time of the query 140. With the query 140, the query analyzer 330 accesses the change log compaction data structure 324 constructed of entries 322 by the constructor 320. Based on the entries 322 within the change log compaction data structure 324, the query analyzer 330 determines whether any entry 322 satisfies the query 140. When at least one entry 322 of the change log compaction data structure 324 satisfies the query 140, the database synchronization system 100 returns the corresponding at least one entry 322 to the client 20.

Referring to FIGS. 4A-4D, these figures are predominantly similar examples of the compacter 300 except for the particular response to the query 140. In some configurations, the database synchronization system 100 returns the corresponding at least one entry 322 to the client 20 as the response 150. Depending on the at least one entry 322 satisfying the query 140, the response 150 may additionally include further detail regarding the at least one entry 322. In some examples, when multiple entries 322 of the change log compaction data structure 324 satisfy the query 140, the database synchronization system 100 returns the corresponding entries 322 to the client 20 as a sorted range 152 by a start of the range 152 in the index space 326i or the data space 326d. For example, by sorting the range 152, the client 20 may receive the synchronization chronologically. In some implementations, the entry 322 satisfying the query 140 is an interval entry 322i. Here, for each interval entry 322i satisfying the query 140, the response 150 includes a span 154 that is defined as a set of all corresponding versions of the database 130 defined by the interval entry 322i. In these implementations, as part of the span 154, the response 150 includes a start version $t_{start}$ of the database 130 and an end version tend of the database 130.

Figure 4A:
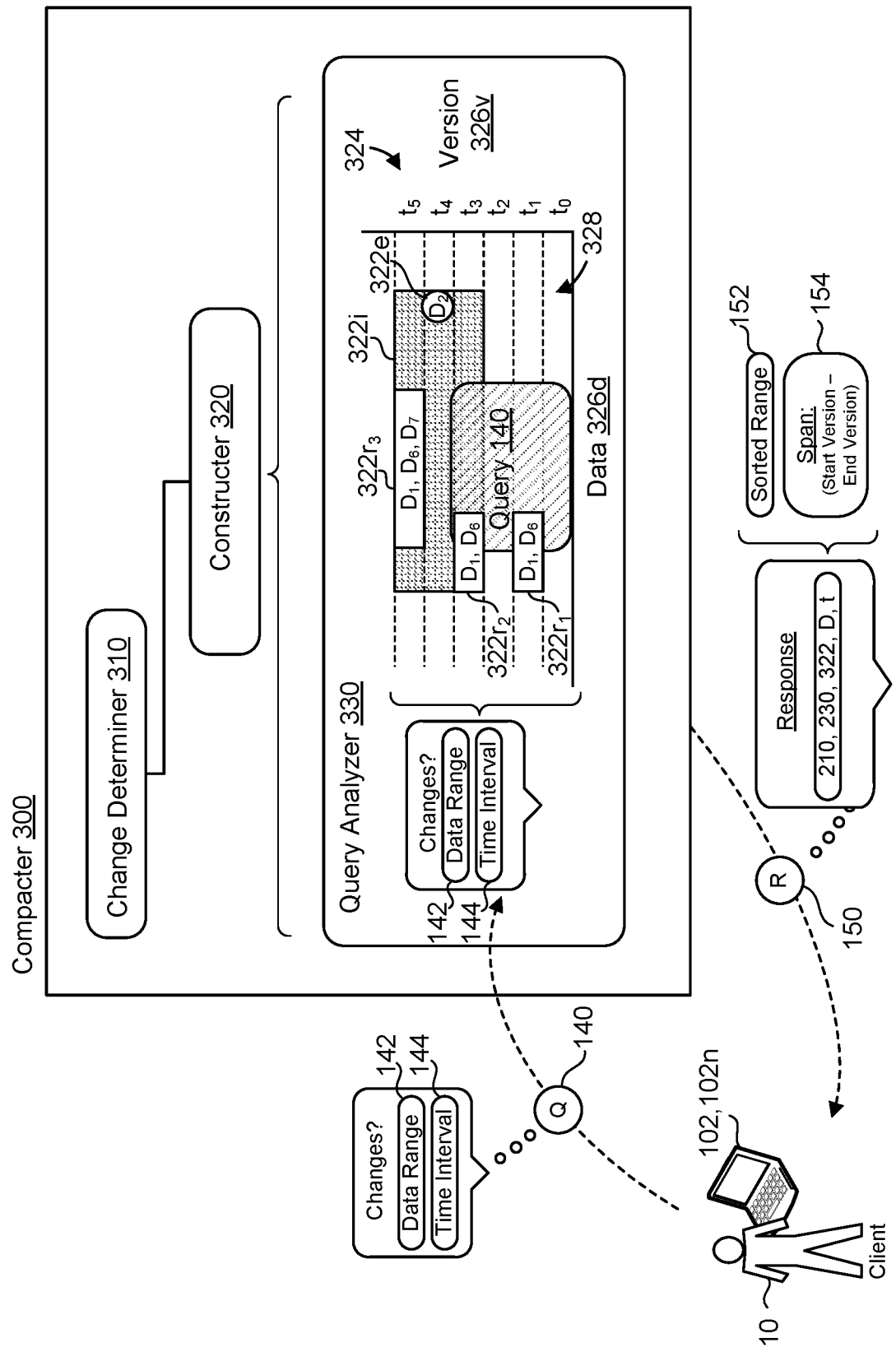
FIGS. 4A-4D are schematic views of example queries within a database synchronization environment.
Figure 4B:
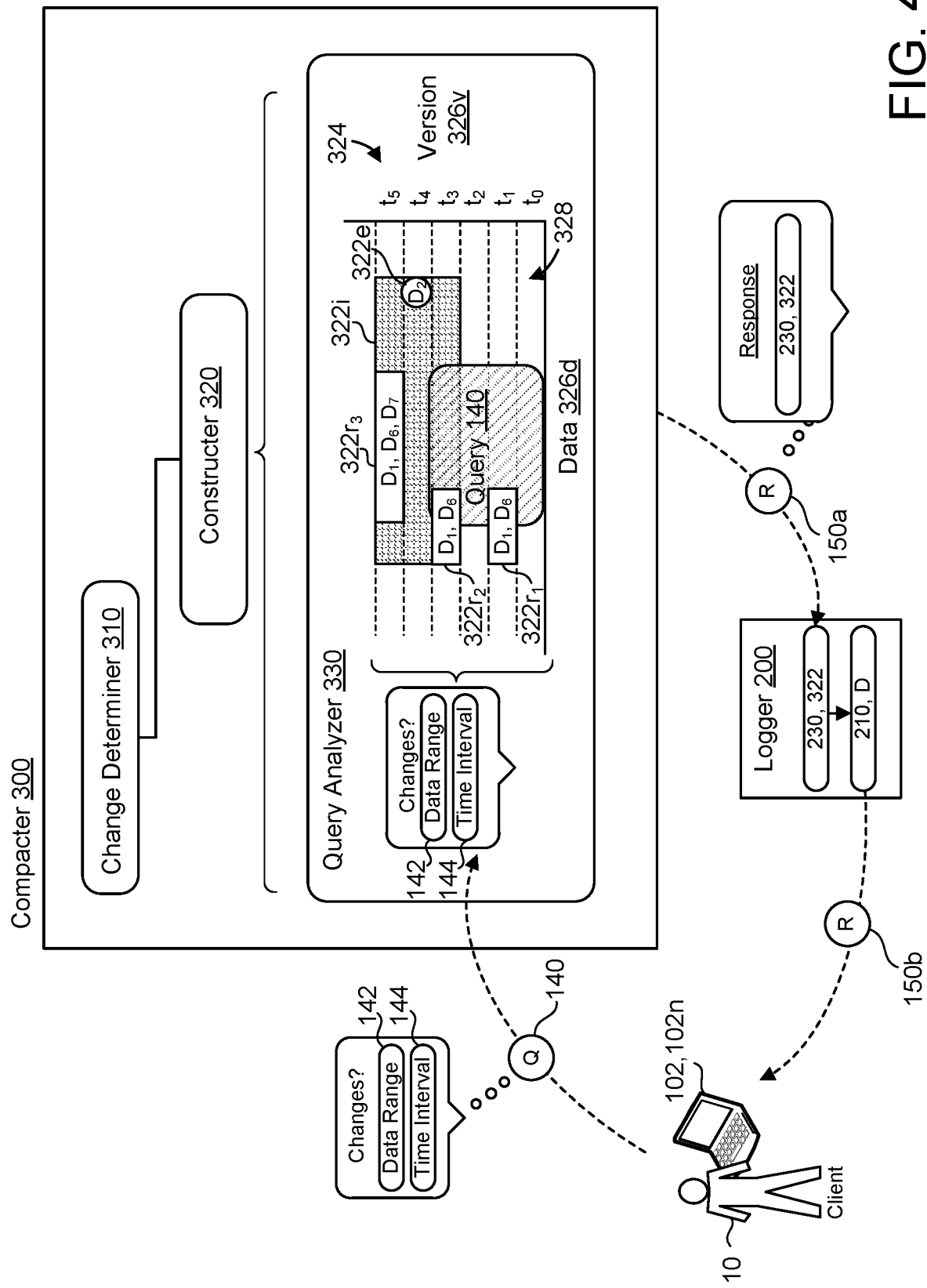

The response 150, as illustrated by FIG. 4A, may be at least one of a database change indicator 230, a database change log entry 210, or a change corresponding to the at least one entry 322. For example, the database synchronization system 100 is configured to reverse determine, from the at least one entry 322 satisfying the query 140, the corresponding database change indicator 230, the database change log entry 210, or the underlying change in the data D. In some examples, such as FIGS. 4B and 4D, the database synchronization system 100 communicates a first response 150a to the database logger 200. The first response 150a may be communicated by the compacter 300 and may include either the at least one entry 322 satisfying the query 140, a database change indicator 230 corresponding to the at least one entry 322, or both. If the database logger 200 receives, as the first response 150a, at least one database change indicator 230, the database logger 200 may be further configured to cross reference the at least one database change indicator 230 to provide, as a second response 150b to the client 20 and/or the client device 102, a database change log entry 210 and/or the original data change.

Figure 4C:
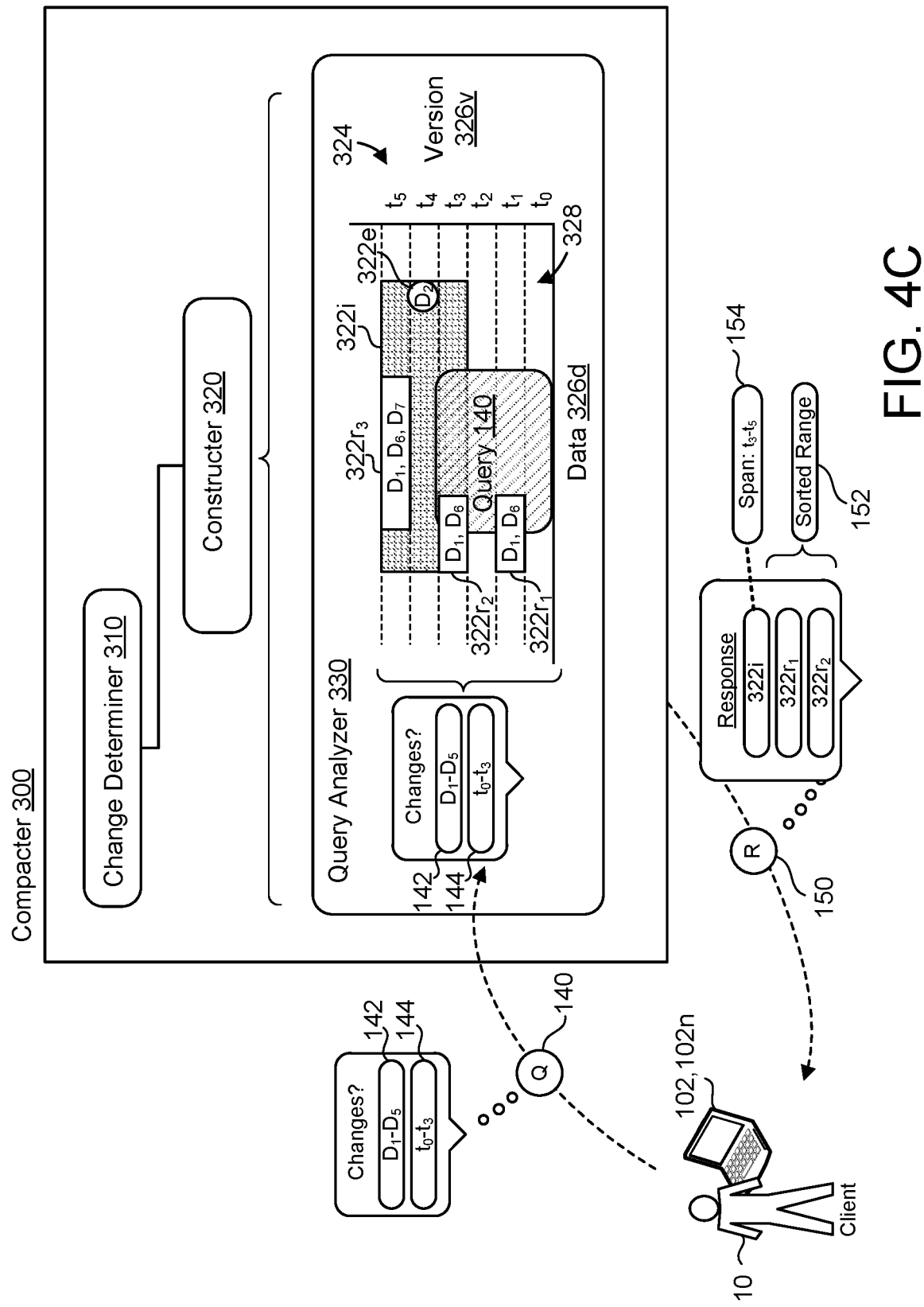
Figure 4D:
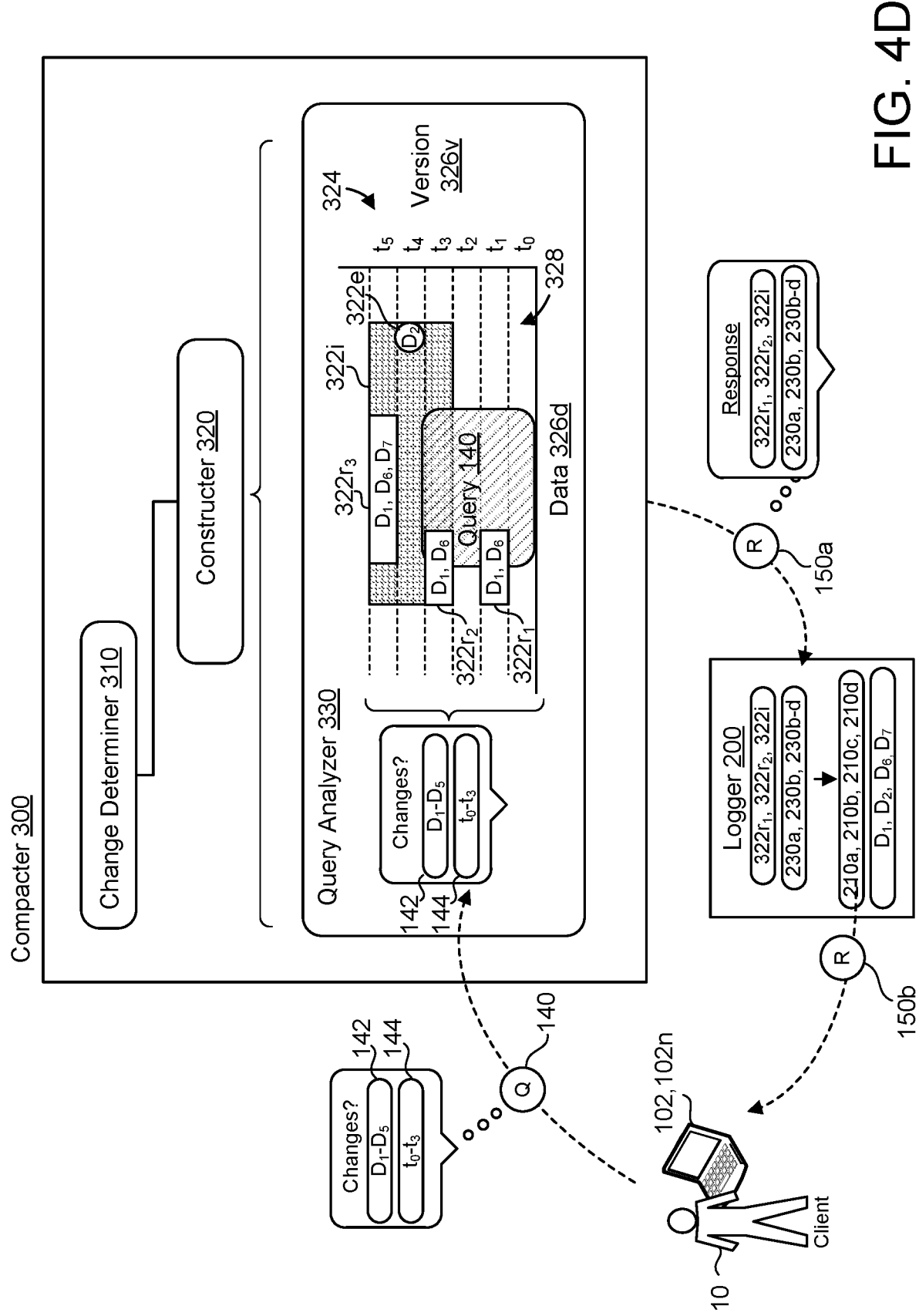

FIGS. 4C and 4D are examples of the query 140 and the response 150 as they relate to the examples illustrated in FIGS. 2 and 3. FIG. 4C is an example of a single response 150 based on the query 140, while FIG. 4D is an example of a multi-step response 150 based on the same query 140. FIGS. 4C and 4D depict the query 140 with a data range 142 of data $D_1$-$D_5$ and a time interval 144 of $t_0$-$t_3$. Here, the query analyzer 330 receives the query 140 and compares the data range 142 and the time interval 144 to the change log compaction data structure 324. This comparison identifies three overlapping entries 322 within the change log compaction data structure 324—an interval entry 322i and two range entries 322r, $322r_{1-2}$. As part of the response 150, the database synchronization system 100 returns a span 154, $t_3$-$t_5$, of the interval entry 322i along with a sorted range 152. FIG. 4D depicts similar results, but with respect to a first response 150a and a second response 150b. As illustrated, the first response 150a returns entries 322i, $322r_1$, $322r_2$ and database change indicators 230a-d. Here, the query analyzer 330 communicates the first response 150a to the database logger 200 such that the database logger 200 may additionally provide the corresponding database log entries 210a-d and/or the data $D_{1-2}$ and $D_{6-7}$ related to the database log entries 210a-d. These corresponding database log entries 210a-d and/or data $D_{1-2}$ and $D_{6-7}$ may then be communicated to the client 20 and/or the client device 102 via the second response 150b. In some examples, the database synchronizer system 100 communicates both the first response 150a and the second response 150b to the client 20 and/or the client device 102.

Referring back to FIG. 2, FIG. 2 further illustrates a potential deficiency with some systems that update according to database changes. For example, if a client device 102 previously updated at the first version to and then subsequently updates at the fourth version $t_3$, in some systems the client device 102 may receive inaccurate communication that there have been no changes to the database 130. For example, if the client device 102 was configured to scan for changes at the fourth version $t_3$ compared to the first version to, the client device 102 may fail to identify changes because the database 130 appears to contain the same data $D_1$-$D_5$. The database 130, however, according to the database change log 220, has logged four modifications to the database 130. During this time, the database 130 has actually expanded to include data $D_6$ and also later removed data $D_6$. In other words, comparing a first snapshot (e.g., first version at to) to a second snapshot (e.g., the fourth version at $t_3$) fails to account for the changes that occurred between the first snapshot and the second snapshot. If the client device 102 instead reviewed the change log compaction data structure 324, the client device 102 would identify changes between the first version to and the fourth version $t_3$. Knowledge of the changes that occur between snapshots may aid data troubleshooting, indicate unauthorized modification of data to a system, or identify for a client 20 whether the changes may impact other data.

Figure 5:
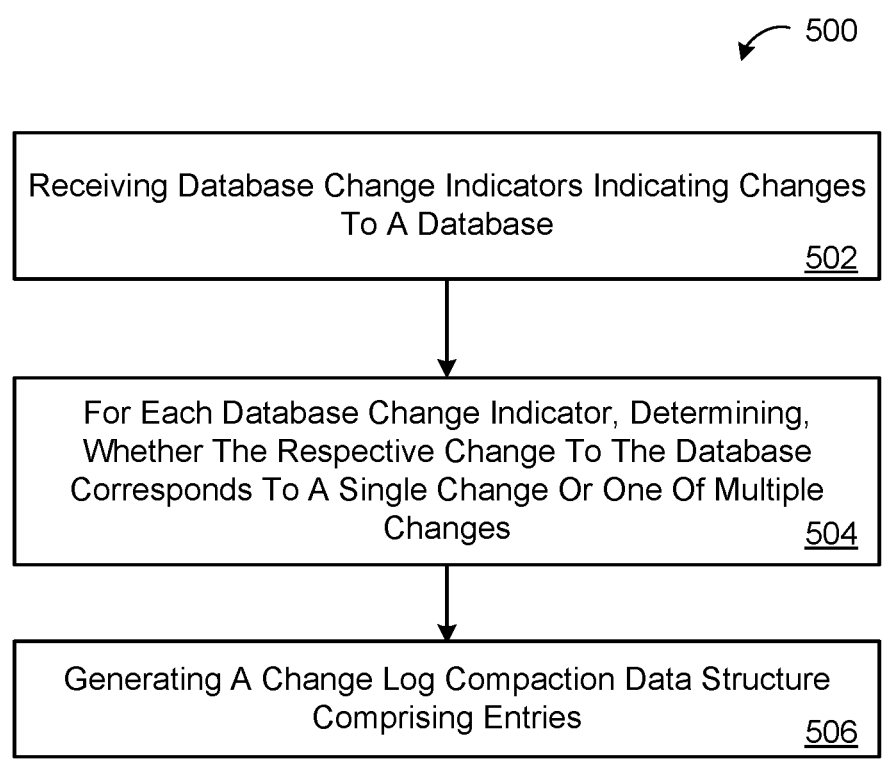
FIGS. 5 and 6 are block diagrams of example arrangements of operations performed within the database synchronization environment.
Figure 6:
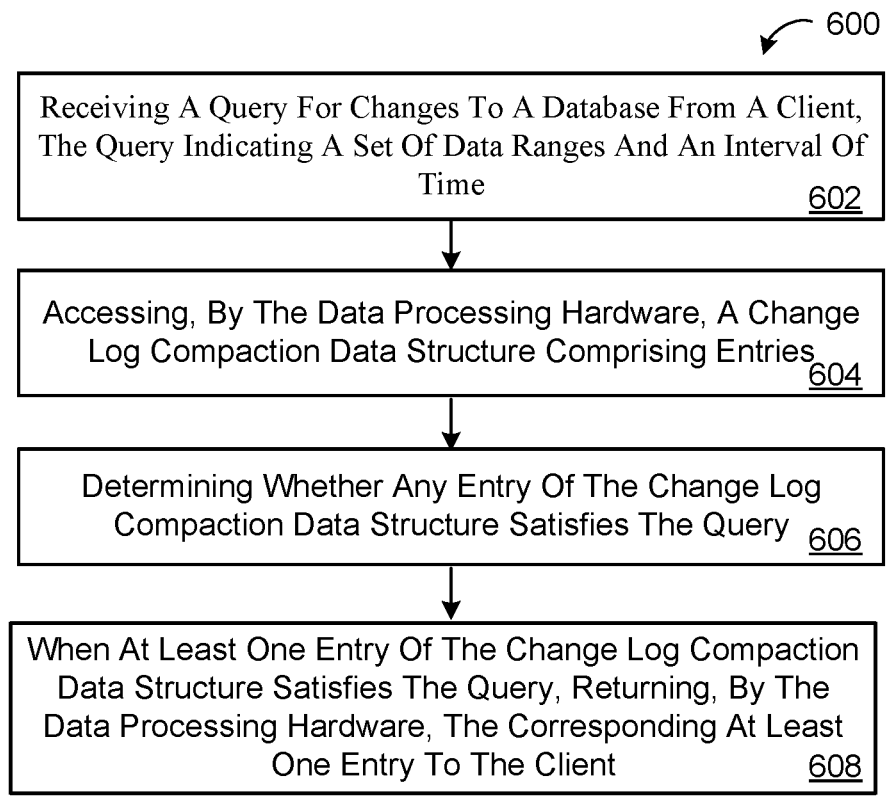

FIGS. 5 and 6 are example methods 500 and 600 regarding operating a database synchronization system. At 502, the method 500 includes receiving database change indicators 230 indicating changes to a database 130. At 504, the method 500 further includes, for each database change indicator 230, determining whether the respective change to the database 130 corresponds to a single change 312 to a single version of the database 130, one of one of multiple changes 314c to a common version of the database 130, or one of multiple changes 314d to different versions of the database 130. At 506, the method 500 also includes generating a change log compaction data structure 324 comprising entries 322. At 602, the method 600 includes receiving a query 140 for changes to a database 130 from a client 102, the query 140 indicating a set of data ranges 142 and an interval of time 144. At 604, the method 600 includes accessing a change log compaction data structure 324 comprising entries 322. At 606, the method 600 further includes determining whether any entry 322 of the change log compaction data structure 324 satisfies the query 140. At 608, the method 600 also includes when at least one entry 322 of the change log compaction data structure 324 satisfies the query 140, returning the corresponding at least one entry 322 to the client 20.

Figure 7:
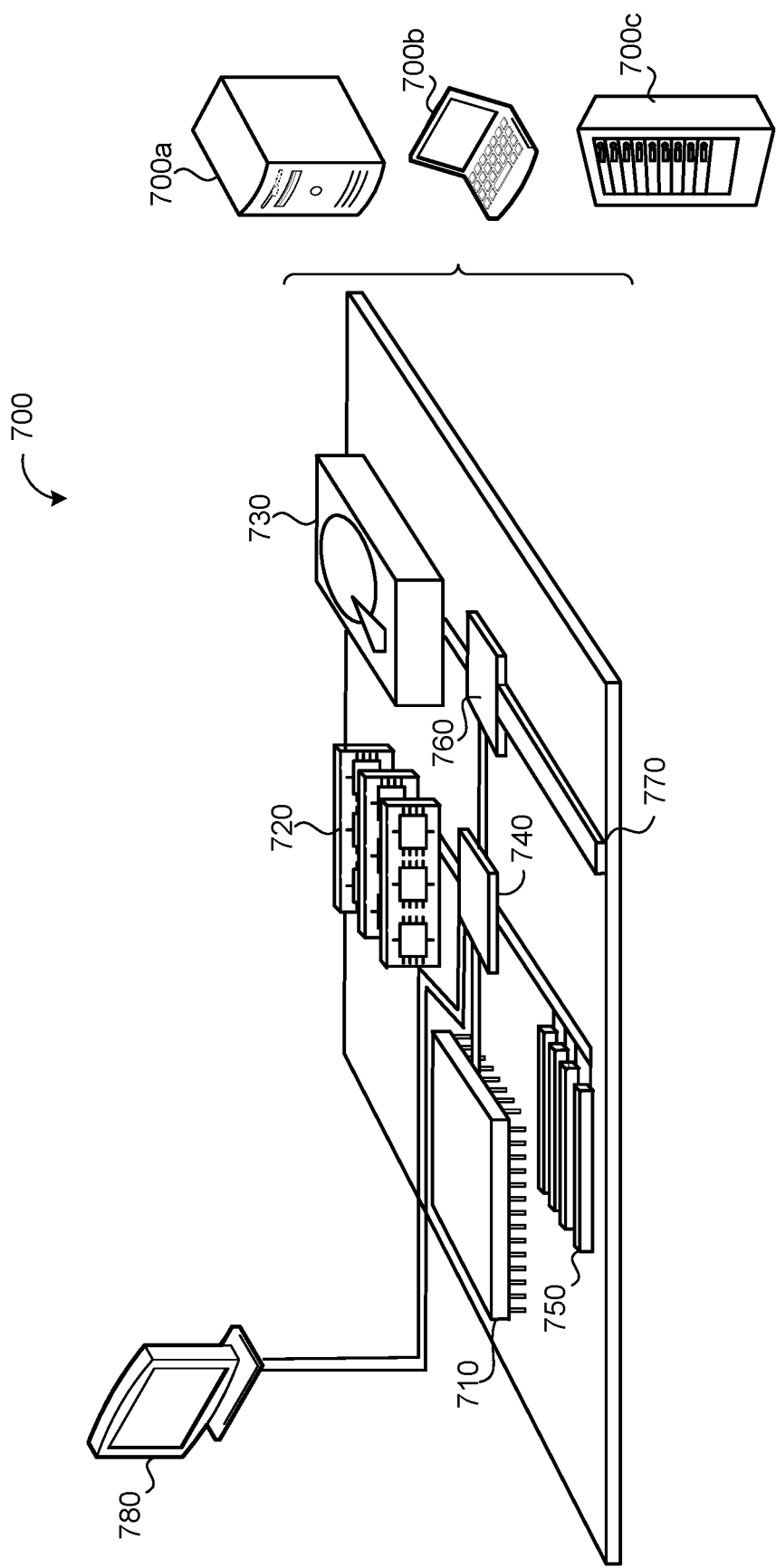
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, from a client, a query requesting changes to a distributed database;
   accessing a change log compaction data structure comprising an index space and a data space, wherein any negative space of the index space comprises known space having no changes to the distributed database;
   determining that a particular entry of the change log compaction data structure satisfies the query;
   in response to determining that the particular entry of the change log compaction data structure satisfies the query, returning the particular entry to the client;
   receiving a synchronization query from a client device associated with the distributed database, the synchronization query requesting synchronization between the distributed database and another database; and
   transmitting a query response to the other database based on the change log compaction data structure, the query response configured to cause the other database to synchronize with the distributed database, wherein the query response comprises a bloom filter.

2. The method of claim 1, wherein the operations further comprise generating, based on one or more database change indicators, the change log compaction data structure.

3. The method of claim 2, wherein the operations further comprise, for each database change indicator, classifying the database change indicator to the distributed database corresponds as:
   a single change to a single version of the distributed database;
   one of multiple changes to a common version of the distributed database; or
   one of multiple changes to different versions of the distributed database.

4. The method of claim 2, wherein each change indicator indicates an addition, a deletion, or a modification to the distributed database.

5. The method of claim 1, wherein the change log compaction data structure comprises a plurality of entries, each entry of the plurality of entries defining one or more changes to the distributed database.

6. The method of claim 1, wherein each entry of the change log compaction data structure comprises:
 an exact entry defining a corresponding single change to a corresponding single version of the distributed database;
 a range entry defining corresponding multiple changes to a corresponding common version of the distributed database; or
 an interval entry defining corresponding multiple changes to corresponding different versions of the distributed database.

7. The method of claim 1, wherein the synchronization query indicates a set of data ranges and an interval of time.

8. The method of claim 1, wherein the query response comprises at least one of
 a database change indicator,
 a database change log entry, or
 a change corresponding to at least one entry of the change log compaction data structure that satisfies the synchronization query.

9. A system comprising:
 data processing hardware; and
 memory hardware in communication with the data processing hardware, the memory hardware storing instructions that when executed on the data processing hardware cause the data processing hardware to perform operations comprising:
  receiving, from a client, a query requesting changes to a distributed database;
  accessing a change log compaction data structure comprising an index space and a data space, wherein any negative space of the index space comprises known space having no changes to the distributed database;
  determining that a particular entry of the change log compaction data structure satisfies the query;
  in response to determining that the particular entry of the change log compaction data structure satisfies the query, returning the particular entry to the client;
  receiving a synchronization query from a client device associated with the distributed database, the synchronization query requesting synchronization between the distributed database and another database; and
  transmitting a query response to the other database based on the change log compaction data structure, the query response configured to cause the other database to synchronize with the distributed database, wherein the query response comprises a bloom filter.

10. The system of claim 9, wherein the operations further comprise generating, based on one or more database change indicators, the change log compaction data structure.

11. The system of claim 10, wherein the operations further comprise, for each database change indicator, classifying the database change indicator to the distributed database corresponds as:
 a single change to a single version of the distributed database;
 one of multiple changes to a common version of the distributed database; or
 one of multiple changes to different versions of the distributed database.

12. The system of claim 10, wherein each change indicator indicates an addition, a deletion, or a modification to the distributed database.

13. The system of claim 9, wherein the change log compaction data structure comprises a plurality of entries, each entry of the plurality of entries defining one or more changes to the distributed database.

14. The system of claim 9, wherein each entry of the change log compaction data structure comprises:
 an exact entry defining a corresponding single change to a corresponding single version of the distributed database;
 a range entry defining corresponding multiple changes to a corresponding common version of the distributed database; or
 an interval entry defining corresponding multiple changes to corresponding different versions of the distributed database.

15. The system of claim 9, wherein the synchronization query indicates a set of data ranges and an interval of time.

16. The system of claim 9, wherein the query response comprises at least one of
 a database change indicator,
 a database change log entry, or
 a change corresponding to at least one entry of the change log compaction data structure that satisfies the synchronization query.

* * * * *